March 8, 1927.
G. W. CARY
DRILL CHUCK
Filed Jan. 9, 1926
1,620,440
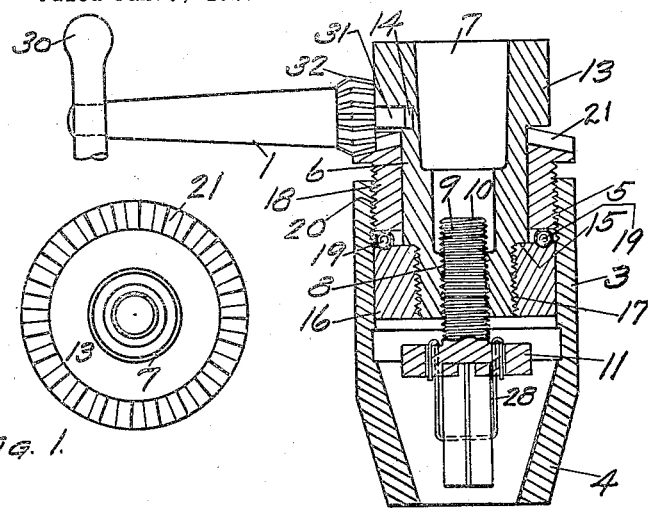
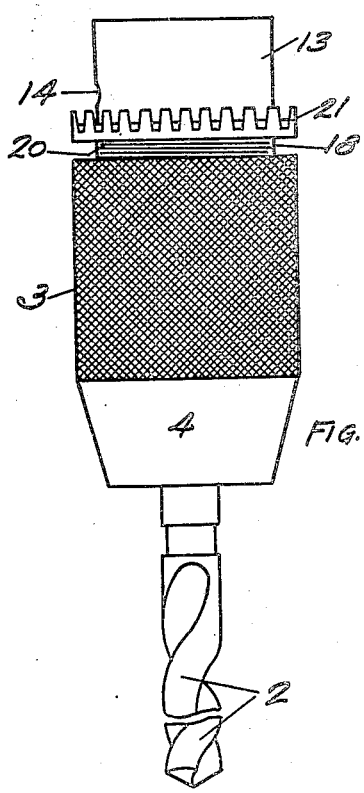
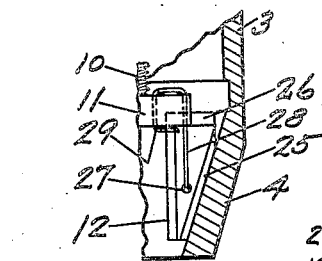
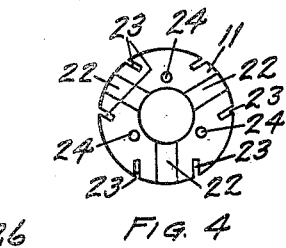
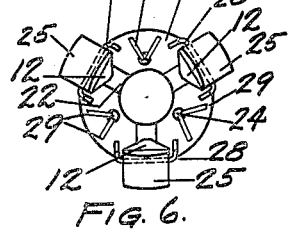
INVENTOR.
George W. Cary,
BY
Frank A. Cutter,
ATTORNEY.

Patented Mar. 8, 1927.

1,620,440

UNITED STATES PATENT OFFICE.

GEORGE W. CARY, OF GREENFIELD, MASSACHUSETTS, ASSIGNOR TO GOODELL MANUFACTURING COMPANY, OF GREENFIELD, MASSACHUSETTS, A CORPORATION OF MASSACHUSETTS.

DRILL CHUCK.

Application filed January 9, 1926. Serial No. 80,346.

My invention relates to chucks which are especially adapted for electric drills, and consists essentially and generally of a shell which is conical at one end, a hollow and internally screw-threaded body, a collar mounted on and secured to said body and fitting within the cylindrical part of said shell, a sleeve loosely mounted on said body and to which said shell is attached, said sleeve being provided at the outer end with gear teeth, anti-friction members between said collar and said sleeve, a spindle having a head, said spindle being screw-threaded to engage the screw-threads in said body, and spring-pressed gripping jaws carried by said head, together with a holding and reversing or unlocking key for said body and said sleeve, and such other parts and members as may be necessary or desirable in order to render the chuck complete and serviceable in every respect, all as hereinafter set forth.

The primary object of my invention is to produce a chuck, of the character described, which can be easily and quickly operated for gripping and releasing the drill, and is self-tightening on the drill and capable of taking a powerful hold thereon.

A further object is to provide simple and convenient means for holding the body of the chuck while releasing the drill, and, when necessary, for exerting any extra force required to loosen the parts, in the event they become so tightly set as to prevent loosening by application of the hand to the shell.

This chuck is comparatively simple in construction, as well as in operation, consists of few parts which are not liable to break or get out of order, and as a whole is strong and durable.

Other objects and advantages will appear in the course of the following description.

I attain the objects and secure the advantages of my invention by the means illustrated in the accompanying drawings, in which—

Figure 1 is a top plan of a chuck which embodies a practical form of my invention; Fig. 2, a side elevation of said chuck; Fig. 3, a central, vertical or longitudinal section through said chuck; Fig. 4, a bottom plan of the head which carries the jaws; Fig. 5, a fragmentary detail, in partial section, of a portion of the lower terminal of the chuck, showing a side elevation of one of the jaws, and, Fig. 6, a bottom plan of said jaws, their springs, and said head.

Similar reference characters designate similar parts throughout the several views.

In Fig. 3 a holding and operating key, which will hereinafter be described in detail, is represented at 1; and in Fig. 2 a drill is represented at 2, the same being in place in the chuck.

A shell 3, generally similar to corresponding elements found in other chucks, constitutes a part of this chuck, and the same has a conical bottom part 4 as usual, and is interiorly screw-threaded at the upper terminal, as represented at 5.

A body 6 has an axial passage 7 therethrough the upper portion of which may be tapered to receive the tapered spindle (not shown), of an electric drill, by means of which the chuck is revolved. The walls of the lower portion of the passage 7 are screw-threaded, as represented at 8, to receive screw-threads 9 on a spindle 10. It is expedient that the screw-threads 8 and 9 extend or run in the opposite direction to the screw-thread 5, for reasons which presently will appear, consequently, if the latter be a right-hand thread, as preferably is the case, the former are left-hand threads. The spindle 10 has at the lower end an integral disc or head 11 which carries a plurality (usually three) of gripping jaws 12. The body 6 has a head 13 at the upper terminal, in which is a radial recess 14. The body 6 also has an exterior shoulder 15, and that portion of said body which is below said shoulder is exteriorly screw-threaded to receive an internally screw-threaded collar 16, as represented at 17. The collar 16 is screwed on to the lower part of the body 6 and tight against the shoulder 15, and has a sliding fit in the shell 3.

Loosely mounted on the body 6 between the head 13 and the collar 16 is a sleeve 18. Balls 19 are interposed between the top of the collar 16 and the bottom of the sleeve 18 to provide an anti-friction bearing for said sleeve. The sleeve 18 is exteriorly screw-threaded at 20 and adapted to fit into the upper part of the shell 3 and engage the screw-threads 5. Teeth are formed on the upper end of the sleeve 18 to convert the same into a bevel-gear 21. The sleeve 18 is held against endwise movement by the head 13 and the balls 19.

In the bottom of the jaw-carrying head 11 are three radial slots 22 which are spaced equidistant apart; in the periphery of said head are three pairs of vertical grooves 23, the grooves in each pair being on opposite sides of and adjacent to the outer terminal of one of said slots; and extending through said head are three vertical openings 24 which are spaced equidistant apart and alternate with said slots.

Each jaw 12 is of the general shape illustrated in the drawings, and has a fairly broad, outer face tapered and curved to correspond with the inner surface of the conical part 4 of the shell 3, as best shown at 25, whereby a sufficient amount of surface, and surface of a suitable shape, is provided for contact with said inner surface of said conical part to afford the necessary frictional resistance, and insure the movement of said finger with said shell, when the latter is rotated in either direction, assuming that the finger be forcibly held against the aforesaid inner surface. At the top of each jaw 12 is a rib 26 which is of a size and shape to fit and slide in one of the slots 22, with the parts of said jaw that are on each side of said rib bearing against the under side of the head 11. An opening 27, intermediate of the ends of each jaw 12, extends through the same from side to side.

Three springs 28 are provided to retain the jaws 12 in place against the under side of the head 11, with the ribs 26 in the slots 22, and normally to dispose said jaws outwardly in such a manner that considerable portions of the same extend beyond the periphery of the head 11. Each spring 28 is looped through the opening 27 in one of the jaws 12, extends upwardly on both sides of said jaw and through two of the grooves 23 in the head 11, over the top of said head, and down through two of the openings 24, to have its terminals bent over on the under side of the head, as shown at 29. The upwardly extending branches of each spring 28 extend through the grooves 23 that are on opposite sides of the slot 22 wherein is located the rib 26 of the finger 12 through which said spring passes, and the terminals of said spring pass through the two openings 24 that are on opposite sides of said slot. It follows, therefore, that parts of two different springs are passed through each opening 24. It will now be seen that the springs 28 serve the double purpose of holding the fingers 12 against the head 11 above and forcibly thrusting said fingers outwardly against the inside of the conical part 4 of the shell 3.

The key 1 consists of a shank having at the outer end a handle 30 and at the inner end an extension 31, and a bevel-gear 32 secured to said shank outside of said extension. The extension 31 is adapted to fit within the recess 14 in the head 13, and the bevel-gear 32 to intermesh with the bevel-gear 21.

The operation of this chuck is described as follows:

The jaws 12 have their curved surfaces 25 in contact at all times with the inner surface of the conical part 4 of the shell 3, and the amount of separation of said jaws depends on the position of the head 11 and the spindle 10 relative to said conical part. To illustrate: If the jaws 12 be wide open and the shell 3 rotated to the right while the body 6 is held stationary, said jaws, being thrust by the springs 28 against the conical part 4, are carried in the same direction, due to the frictional engagement of said jaws with said conical part. The jaws 12, guided at all times by the ribs 26 in the slots 22, which ribs have no lateral movement in said slots, carry with them the head 11 and the spindle 10, and the latter, due to the fact that it is in engagement with the body 6 through the medium of the left-hand screw-threads 8 and 9, is forcibly moved downwardly, and causes said jaws to move towards the center of said head until contact is made with a tool, such as the drill 2. The drill 2 is inserted through the bottom of the shell 3 and between the jaws 12. As the rotation of the shell 3 is continued, the jaws 12 are forced tighter and tighter against the conical part of the shell 3 and by said part tighter and tighter against the drill shank or head portion, and the action of the drill in use tends constantly to tighten said jaws thereon.

In order to remove the drill 2 from the chuck, it is first necessary to loosen the fingers 12 therefrom, and this is done by rotating the shell 3 to the left. As the shell 3 is rotated to the left, the jaws 12 are carried in the same direction, being in frictional engagement with said shell as previously explained, and are also at the same time carried upwardly by reason of the engagement of the spindle 10 with the body 6, through the medium of the left-hand threads 8 and 9. As the jaws 12 move upwardly in the conical part 4, their grip on the drill head is first relaxed and then released altogether, and the springs 28 thrust said jaws outwardly from said head, when the drill can be taken from the chuck. If there is a tendency on the part of the machine spindle, upon which the body 6 is mounted, to turn backward, at the time the sleeve 3 is rotated to bring about the release of the drill 2, the extension 31 of the key 1 is inserted in the recess 14 in the head 13 and the bevel-gear 32 interengaged with the bevel-gear 21, as illustrated in Fig. 3. By the rotation of the key 1, the operator is enabled, through the action of the bevel-gears 21 and 32, to rotate the shell 3 to the left, and thereby to release the drill 2. As soon as the parts are unlocked or started from their locked condition, the key is usually removed and the operation continued and completed by applying the hand to the shell 3.

The key might be employed for tightening the jaws on the drill head, but this is seldom necessary, and in probably the majority of cases said key is not required even for starting the unlocking operation; but it is frequently necessary to apply the key to hold the body against rotation at the time the jaws are forced apart to release the drill, or at the beginning of the releasing operation.

When the jaws 12 are actuated into clamping position, the sleeve 18 rotates on the balls 19, and such is also the case when said jaws are actuated into open position.

The shell 3, when in locking or clamping position, draws or forces the sleeve 18 toward the collar 16 and hard against the balls 19, hence the need of the anti-friction bearing at this point.

The shell 3 is not rotated independently of the shell 18, except when the parts of the chuck are assembled or taken apart, and said shell may be screwed up on said sleeve against the under side of the tooth flange. The opposite directions given to the engaging screw-threads 5 and 20 and the engaging screw-threads 8 and 9 prevent the shell 3 from being screwed down on the sleeve 18 at the time the fingers 12 are tightened on the drill. At other times there is no appreciable tendency on the part of said shell to move down on the sleeve.

The term revolution with its derivatives, as herein employed, includes a partial revolution as well as a complete revolution.

More or less change in the shape, size, construction, and arrangement of some or all of the parts of this chuck may be made, without departing from the spirit of my invention, or exceeding the scope of what is claimed.

What I claim as my invention, and desire to secure by Letters Patent, is—

1. In a drill chuck, a body, a jaw-carrying member carried by said body, outwardly spring-pressed jaws supported from said member, a sleeve loosely mounted on said body, means to hold said sleeve against endwise movement, and a shell in engagement with said sleeve and having a conical part with which said jaws are in engagement, said body and jaw-carrying member being provided with means to cause said member to be moved lengthwise of its axis, when said shell with said jaws is rotated in either direction, and the engagement between said jaws and sleeve being by friction only, whereby both said jaws and sleeve rotate together to cause the jaws to move in and out of the sleeve.

2. In a drill chuck, a screw-threaded body, a jaw-carrying member having a screw-threaded spindle to engage the screw threads in said body, outwardly spring-pressed jaws supported from said member, a screw-threaded sleeve loosely mounted on said body, means to hold said sleeve against endwise movement, and a screw-threaded shell in engagement with said sleeve and having a conical part with which said jaws are in engagement, the engagement between said jaws and sleeve being by friction only, whereby both said jaws and sleeve rotate together to cause the jaws to move in and out of the sleeve, and the body and spindle screw threads extending in the opposite direction to the shell and sleeve screw threads.

3. The combination, in a drill chuck, with a shell having a conical terminal, of a hollow body having a head at one terminal and internally and externally screw-threaded at the other terminal, a collar screwed onto said last-named terminal, a sleeve loosely mounted on said body between said head and said collar, and in engagement with said shell, whereby said sleeve and shell rotate together, and a head having a spindle screwed onto said body, and equipped with outwardly spring-pressed jaws adapted to engage said conical terminal, the engagement between said jaws and said sleeve being by friction only, whereby both said jaws and said sleeve rotate together to cause the jaws to move in and out of the sleeve.

4. The combination, in a drill chuck, with a shell having a conical terminal, of a hollow body screw-threaded at the inner terminal, a sleeve loosely mounted on said body and in engagement with said shell, whereby said sleeve and shell rotate together, means to hold said sleeve against endwise movement, external means mechanically to rotate said sleeve, and a head having a spindle screwed onto said body, and equipped with outwardly spring-pressed jaws adapted to engage said conical terminal, the engagement between said jaws and said sleeve being by friction only, whereby both said jaws and said sleeve rotate together to cause the jaws to move in and out of the sleeve.

5. In a drill chuck, a hollow body, a sleeve loosely mounted on said body and held against endwise movement thereon, a shell attached to said sleeve and having a conical part with an unbroken inner surface, a head having a spindle in threaded engagement with said body, and outwardly spring-pressed jaws carried by said head and having curved outer faces to engage said inner surface of said conical part, the engagement between said jaws and said sleeve being by friction only, whereby both said jaws and said sleeve rotate together to cause the jaws to move in and out of the sleeve.

6. In a drill chuck, a head having bottom radial slots, vertical peripheral grooves, and vertical openings therethrough, laterally perforated jaws having on top ribs which are receivable and adapted to slide in said radial slots, and springs each of which passes through the lateral perforation in one of said jaws, up through two of said grooves, over the top of said head, and down through two of said openings, to be bent under said head, adjacent parts of two different springs passing through each of said openings, whereby said jaws are held to said head and normally disposed outwardly.

GEORGE W. CARY. [L. S.]